(12) United States Patent
Jiang (10) Patent No.: US 12,454,301 B1
(45) Date of Patent: Oct. 28, 2025

(54) FOLDING CART

(71) Applicant: Zhongshan Weihong Daily Necessities Co., Ltd., Zhongshan (CN)

(72) Inventor: Yidong Jiang, Zhongshan (CN)

(73) Assignee: Zhongshan Weihong Daily Necessities Co., Ltd., Zhongshan (CN)

( * ) Notice: Subject to any disclaimer, the term of this patent is extended or adjusted under 35 U.S.C. 154(b) by 0 days.

(21) Appl. No.: 19/228,738

(22) Filed: Jun. 4, 2025

(30) Foreign Application Priority Data

May 20, 2025 (CN) .......................... 202520990622.7

(51) Int. Cl.
*B62B 3/02* (2006.01)
*B62B 5/06* (2006.01)

(52) U.S. Cl.
CPC ................ *B62B 3/02* (2013.01); *B62B 5/064* (2013.01); *B62B 2205/20* (2013.01)

(58) Field of Classification Search
CPC .................................. B62B 3/02; B62B 3/022
See application file for complete search history.

(56) References Cited

U.S. PATENT DOCUMENTS

| | | | | |
|---|---|---|---|---|
| 5,915,723 A * | 6/1999 | Austin | ...................... | B62B 3/02 |
| | | | | 280/47.35 |
| 8,973,940 B2 * | 3/2015 | Chen | ........................ | B62B 3/02 |
| | | | | 280/638 |
| 9,327,749 B2 * | 5/2016 | Young | ...................... | B62B 5/08 |
| 9,440,668 B1 * | 9/2016 | Chen | ..................... | B62B 5/0013 |
| 9,896,118 B2 * | 2/2018 | Choi | ....................... | B62B 3/007 |
| 9,913,533 B1 * | 3/2018 | Ke | .......................... | B62B 3/002 |
| 10,292,491 B1 * | 5/2019 | Ke | .......................... | A47F 5/137 |
| 10,414,422 B2 * | 9/2019 | Choi | ....................... | B62B 9/082 |
| 10,464,588 B1 * | 11/2019 | Lin | ........................... | B62B 7/08 |
| 10,501,103 B1 * | 12/2019 | Wang | ..................... | B62B 3/007 |
| 10,604,170 B1 * | 3/2020 | Davis | ...................... | B62B 3/008 |
| 10,633,010 B1 * | 4/2020 | Zhang | ..................... | B62B 3/025 |
| 11,091,183 B2 * | 8/2021 | Wu | ......................... | B62B 3/007 |
| 11,465,664 B1 * | 10/2022 | Choi | ....................... | B62B 3/025 |
| 11,772,698 B2 * | 10/2023 | Cui | .......................... | B62B 7/08 |
| | | | | 280/650 |

(Continued)

FOREIGN PATENT DOCUMENTS

| | | |
|---|---|---|
| CN | 215851299 U | 2/2022 |
| CN | 219382532 U | 7/2023 |
| CN | 221251266 U | 7/2024 |

*Primary Examiner* — Jeffrey J Restifo (57) ABSTRACT

A folding cart comprises a foldable frame, which comprises an upper folding frame, a lower folding frame, and a supporting rod assembly arranged between the upper and lower folding frames. An intermediate upright rod is used as a core support body, and a front sliding upright rod and a rear sliding upright rod slide along a front lower rod and a rear lower rod to form a dynamic triangular support structure when unfolded, so that sliding ends of the front sliding upright rod and the rear sliding upright rod automatically slide into predetermined positions to form a stable mechanical support system when the cart is fully expanded. A sliding installation method is used to achieve linkage retraction of the supporting rod assembly during folding, which avoids multi-node operational complexity of traditional fixed triangular support structure, thereby significantly simplifying folding and expanding motions under the premise of high load-bearing capacity.

11 Claims, 7 Drawing Sheets

(56) References Cited

U.S. PATENT DOCUMENTS

| | | | | |
|---|---|---|---|---|
| 11,981,364 | B2* | 5/2024 | Ma | B62B 5/0461 |
| 12,122,440 | B2* | 10/2024 | Yang | B62B 3/007 |
| 12,179,820 | B1* | 12/2024 | Jiang | B62B 3/025 |
| 12,221,150 | B1* | 2/2025 | Kuang | B62B 7/08 |
| 12,304,547 | B2* | 5/2025 | Kuang | B62B 7/062 |
| 12,337,887 | B2* | 6/2025 | Jiang | B62B 3/025 |
| 12,351,225 | B2* | 7/2025 | Lei | B62B 7/08 |
| 12,371,084 | B2* | 7/2025 | Qiao | B62B 5/067 |
| 2003/0025301 | A1* | 2/2003 | Banuelos, III | B62B 3/022 |
| | | | | 280/47.38 |
| 2024/0359718 | A1* | 10/2024 | Ye | B62B 3/001 |
| 2025/0100606 | A1* | 3/2025 | Fang | B62B 5/0013 |

\* cited by examiner

FOLDING CART

CROSS-REFERENCE TO RELATED APPLICATIONS

The application claims priority to Chinese patent application No. 202520990622.7, filed on May 20, 2025, the entire contents of which are incorporated herein by reference.

TECHNICAL FIELD

The present invention belongs to the technical field of carts, and particularly relates to a folding cart.

BACKGROUND

At present, folding carts have already emerged on the market for easy storage. However, many of these folding carts lack sufficient supports after the foldable frames are expanded, when carrying heavy objects or children, the supporting rods are easily damaged and fractured, which has potential safety hazards. To enhance the stability of the overall structure, some folding carts are configured as triangular support structures, although the stability has been strengthened, the operation is complicated and inconvenient when being folded or expanded.

SUMMARY

To solve the problem that the supporting rods of the folding cart in the existing technology are easily damaged and fractured and inconvenient to use, the present invention provides a folding cart.

The present invention is realized through the following technical solutions.

A folding cart comprises a folding frame, wherein the folding frame comprises: an upper folding frame, which includes a front upper rod, a rear upper rod, a front upper sleeve connected to the front upper rod, a rear upper sleeve connected to the rear upper rod, and an upper connecting rod hinged with the front upper sleeve and the rear upper sleeve, respectively; a lower folding frame, which includes a front lower rod, a rear lower rod, a front lower sleeve connected to the front lower rod, a rear lower sleeve connected to the rear lower rod, and a lower connecting rod hinged with the front lower sleeve and the rear lower sleeve, respectively; and a supporting rod assembly, which includes an intermediate upright rod arranged between the upper folding frame and the lower folding frame, and a front sliding upright rod and a rear sliding upright rod arranged on both sides of the intermediate upright rod, respectively; wherein one end of the front sliding upright rod is hinged with the intermediate upright rod, and the other end is slidably arranged on the front lower rod along a length direction of the front lower rod; one end of the rear sliding upright rod is hinged with the intermediate upright rod, and the other end is slidably arranged on rear lower rod along a length direction of the rear lower rod.

The folding cart as described above, the front upper sleeve, the rear upper sleeve, the front lower sleeve and the rear lower sleeve are provided with mounting openings for inserting one end of the front upper rod, the rear upper rod, the front lower rod and the rear lower rod, respectively.

The folding cart as described above, the upper connecting rod is provided with upper hinging portions at both ends, both the front upper sleeve and the rear upper sleeve are provided with upper connecting portions that are correspondingly hinged with left and right sides of the upper hinging portions. The lower connecting rod is provided with lower hinging portions at both ends, both the front lower sleeve and the rear lower sleeve are provided with lower connecting portions that are correspondingly hinged with left and right sides of the lower hinging portions.

The folding cart as described above, the folding cart further comprises a folding lock release mechanism, wherein the folding lock release mechanism includes a front locking assembly used to limit the front sliding upright rod to slide along the length direction of the front lower rod, and a rear locking assembly used to limit the rear sliding upright rod to slide along the length direction of the rear lower rod.

The folding cart as described above, the front locking assembly includes a first limiting member arranged on the front lower rod and used to limit a sliding end of the front sliding upright rod to slide along a direction away from the lower connecting rod, and a first locking member arranged on the sliding end of the front sliding upright rod and used to limit the sliding end of the front sliding upright rod to slide along a direction near the connecting rod.

The folding cart as described above, the rear locking assembly includes a second limiting member arranged on the rear lower rod and used to limit a sliding end of the rear sliding upright rod to slide along the direction away from the lower connecting rod.

The folding cart as described above, the first locking member is provided with a first limiting hole, and the front lower rod is provided with a first limiting member corresponding to the first limiting hole. The first limiting member extends into the first limiting hole to limit the sliding end of the front sliding upright rod to slide along the direction near the lower connecting rod; and the first limiting member disengages from the first limiting hole so as to release the limitation of the sliding end of the front sliding upright rod sliding along the direction near the lower connecting rod.

The folding cart as described above, the folding cart further comprises a wheel assembly, the wheel assembly includes a front wheel rack, a rear wheel rack, and wheels arranged on the front wheel rack and the rear wheel rack. An end of the front upper rod away from the intermediate upright rod and an end of the front lower rod away from the intermediate upright rod are hinged to the front wheel rack, respectively. An end of the rear upper rod away from the intermediate upright rod and an end of the rear lower rod away from the intermediate upright rod are hinged to the rear wheel rack, respectively.

The folding cart as described above, the front wheel rack includes a front lower mounting portion, a front upper mounting portion, and a front wheel rack vertical rod connecting the front lower mounting portion and the front upper mounting portion. The rear wheel rack includes a rear lower mounting portion, a rear upper mounting portion, and a rear wheel rack vertical rod connecting the rear lower mounting portion and the rear upper mounting portion.

Compared with the prior art, the present invention has the following advantages.

In the folding cart according to the present invention, a supporting rod assembly is arranged between an upper folding frame and a lower folding frame, an intermediate upright rod is used as a core support body, and a front sliding upright rod and a rear sliding upright rod slide along a front lower rod and a rear lower rod to form a dynamic triangular support structure when unfolded, so that sliding ends of the front sliding upright rod and the rear sliding upright rod automatically slide into predetermined positions to form a stable mechanical support system when the cart is expanded. A hinged connection between the sliding upright rod and the intermediate upright rod enhances a three-dimensional structural support strength of the frame, and the load stress is effectively dispersed. Besides, a sliding installation method is used to achieve linkage retraction of the supporting rod assembly during folding, which avoids multi-node operational complexity of traditional fixed triangular support structure, thereby significantly simplifying folding and expanding motions under the premise of high load-bearing capacity. Therefore, dual improvement of structural strength and operational convenience is achieved, which not only eliminates the risk of supporting rod fracture but also optimizes use experience.

BRIEF DESCRIPTION OF DRAWINGS

In order to more clearly illustrate the technical solutions in the embodiments of the present invention, the drawings needed in the descriptions of the embodiments will be briefly introduced hereafter. Apparently, the following described drawings are merely a part of the embodiments of the present invention, other drawings can be obtained by those of ordinary skill in the art according to these drawings without any creative works.

DETAILED DESCRIPTION OF THE EMBODIMENTS

In order to make the technical problems, technical solutions and beneficial effects solved by the present invention more clearly, the present invention is further illustrated hereafter in combination with the drawings and embodiments. It should be understood that the embodiments described here are only used to explain the present invention but not to limit the present invention.

Figure 1:
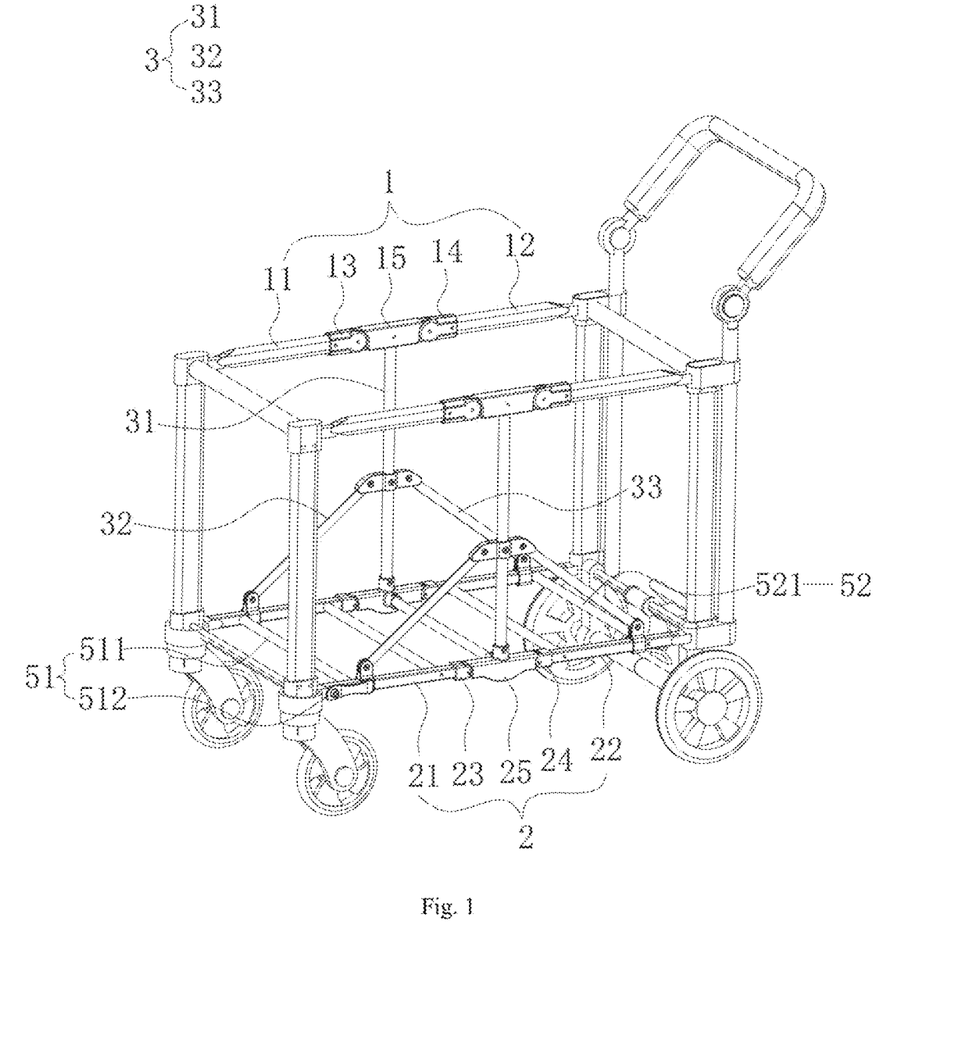
FIG. 1 is a three-dimensional view of an embodiment of the present invention.
Figure 2:
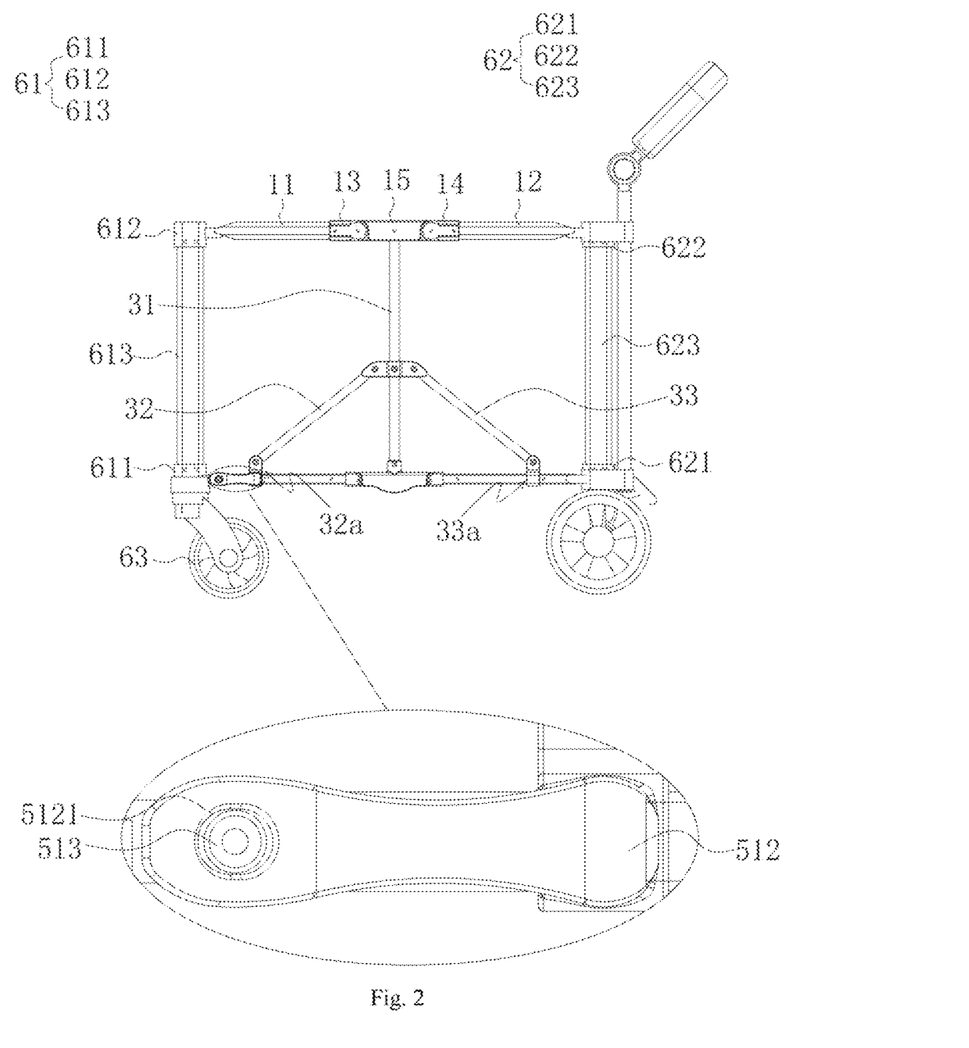
FIG. 2 is a front view of FIG. 1.
Figure 3:
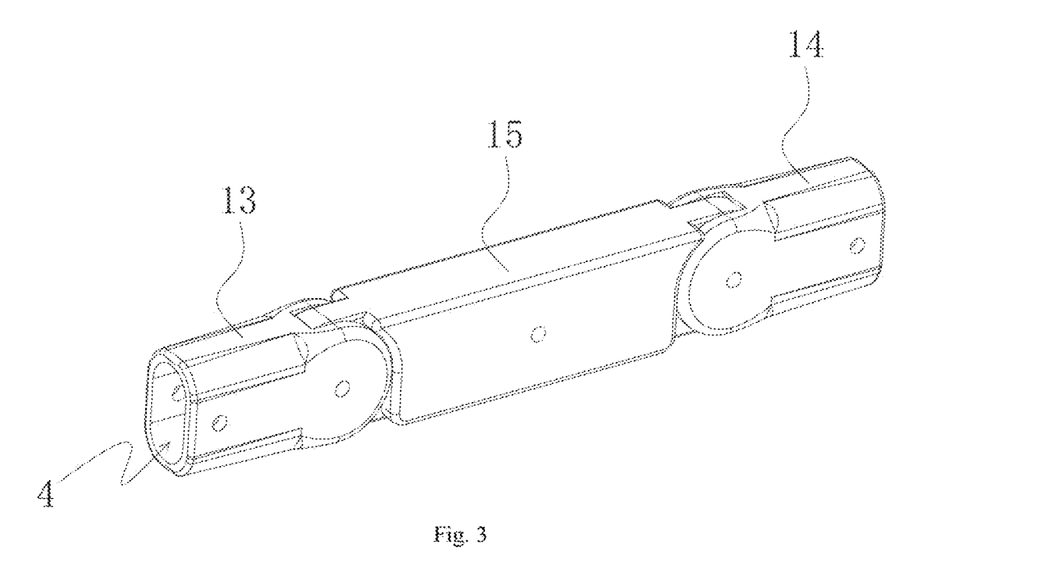
FIG. 3 is a partially exploded view of an upper connecting rod in FIG. 1.
Figure 4:
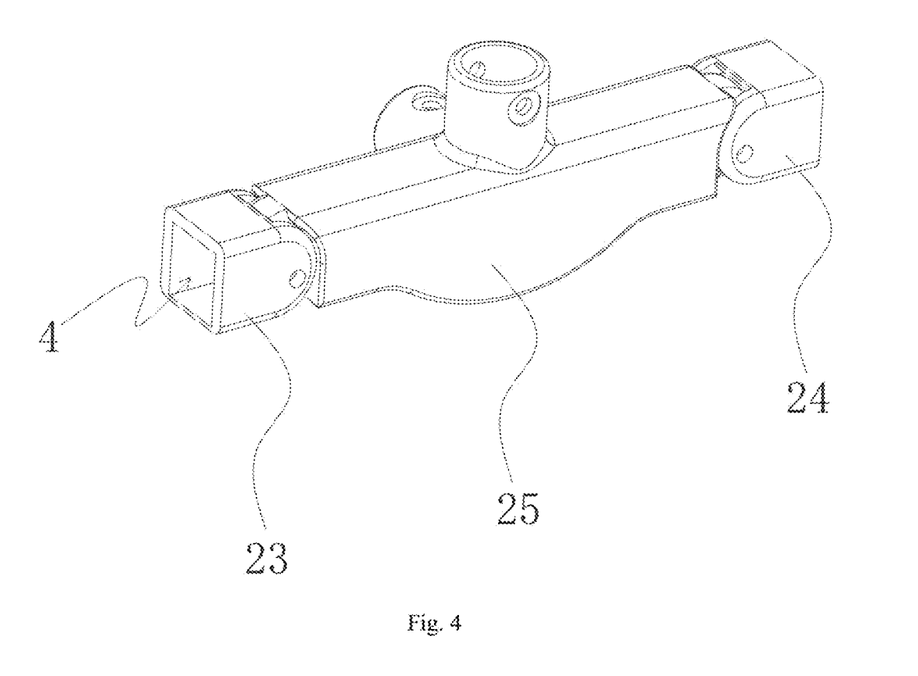
FIG. 4 is a partially exploded view of a lower connecting rod in FIG. 1.
Figure 5:
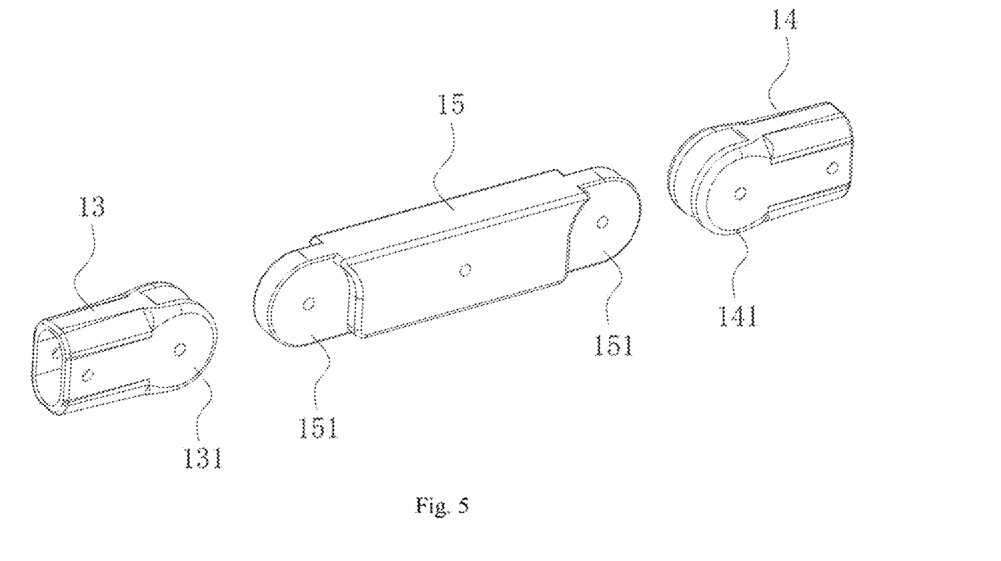
FIG. 5 is an exploded view of FIG. 3.
Figure 6:
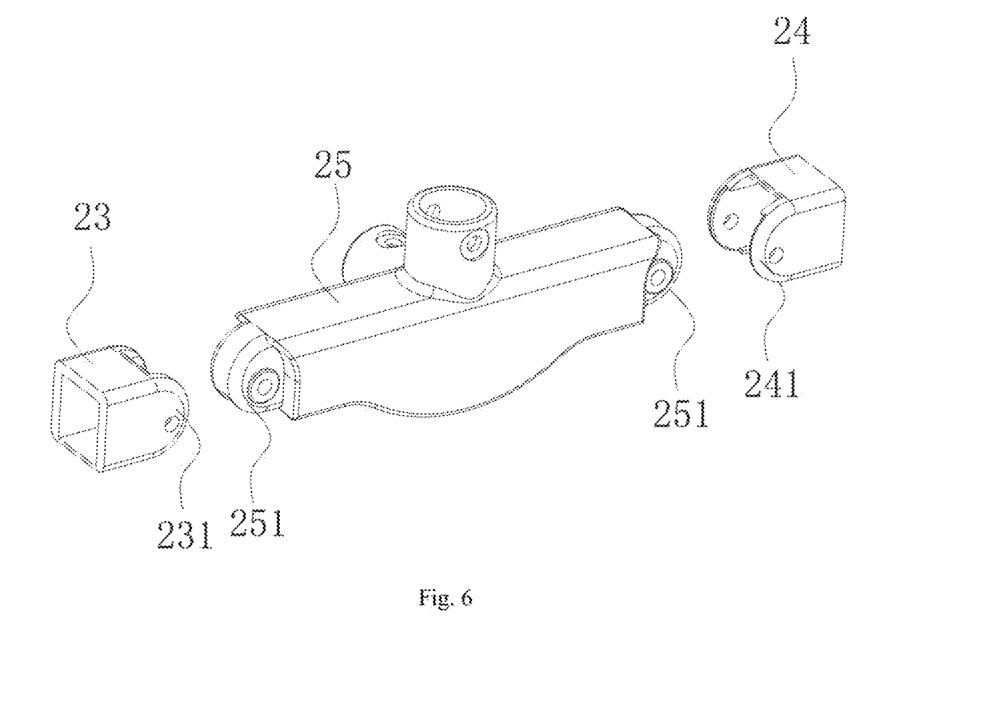
FIG. 6 is an exploded view of FIG. 4.
Figure 7:
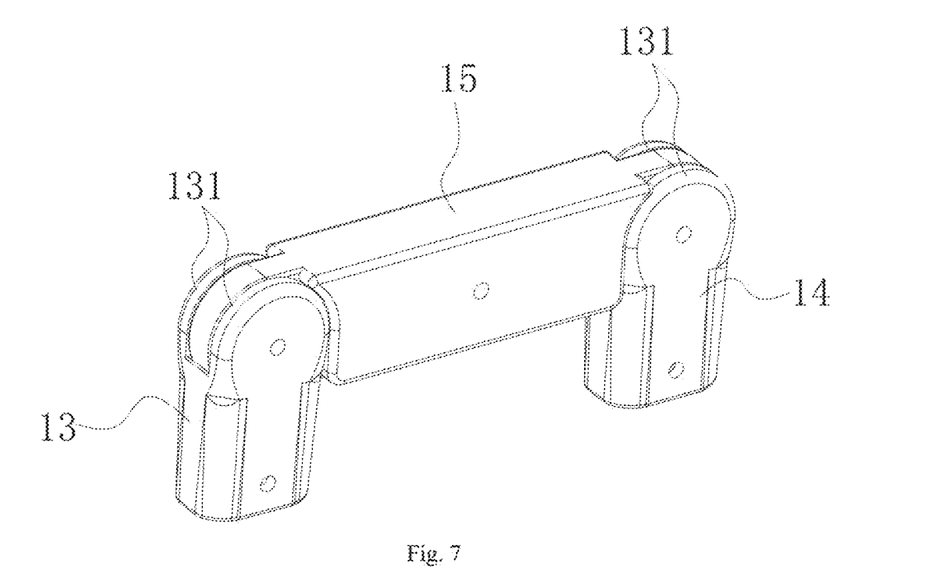
FIG. 7 is a schematic view of FIG. 3 in a folded state.

Please refer to FIGS. 1-7, a folding cart comprises a foldable frame, wherein the foldable frame comprises:

an upper folding frame 1, which includes a front upper rod 11, a rear upper rod 12, a front upper sleeve 13 connected to the front upper rod 11, a rear upper sleeve 14 connected to the rear upper rod 12, and an upper connecting rod 15 hinged with the front upper sleeve 13 and the rear upper sleeve 14, respectively;

a lower folding frame 2, which includes a front lower rod 21 and a rear lower rod 22; and a supporting rod assembly 3, which includes an intermediate upright rod 31 arranged between the upper folding frame 1 and the lower folding frame 2, and a front sliding upright rod 32 and a rear sliding upright rod 33 arranged on both sides of the intermediate upright rod 31, respectively; wherein one end of the front sliding upright rod 32 is hinged with the intermediate upright rod 31, and the other end is slidably arranged on the front lower rod 21 along a length direction of the front lower rod 21; one end of the rear sliding upright rod 33 is hinged with the intermediate upright rod 31, and the other end is slidably arranged on rear lower rod 22 along a length direction of the rear lower rod 22.

In the folding cart according to the present invention, a supporting rod assembly is arranged between an upper folding frame and a lower folding frame, an intermediate upright rod is used as a core support body, and a front sliding upright rod and a rear sliding upright rod slide along a front lower rod and a rear lower rod to form a dynamic triangular support structure when unfolded, so that sliding ends of the front sliding upright rod and the rear sliding upright rod automatically slide into predetermined positions to form a stable mechanical support system when the cart is expanded. A hinged connection between the sliding upright rod and the intermediate upright rod enhances a three-dimensional structural support strength of the frame, and the load stress is effectively dispersed. Besides, a sliding installation method is used to achieve linkage retraction of the supporting rod assembly during folding, which avoids multi-node operational complexity of traditional fixed triangular support structure, thereby significantly simplifying folding and expanding motions under the premise of high load-bearing capacity. Therefore, dual improvement of structural strength and operational convenience is achieved, which not only eliminates the risk of supporting rod fracture but also optimizes use experience.

Further, as the preferred implementation method of this scheme rather than limited, the lower folding frame 2 further includes a front lower sleeve 23 connected to the front lower rod 21, a rear lower sleeve 24 connected to the rear lower rod 22, and a lower connecting rod 2 hinged with the front lower sleeve 23 and the rear lower sleeve 24, respectively.

Further, as the preferred implementation method of this scheme rather than limited, the front upper sleeve 13, the rear upper sleeve 14, the front lower sleeve 23 and the rear lower sleeve 24 are provided with mounting openings for inserting one end of the front upper rod, the rear upper rod, the front lower rod and the rear lower rod, respectively.

In this embodiment, the front upper rod, the rear upper rod, the front lower rod and the rear lower rod can be directly inserted and fixed. This modular design not only simplifies the assembly process and reduces the production costs, but also enhances the connection strength between the components, avoiding potential loosening or fracture issues associated with traditional welding or bolt fastening methods. Its working principle is to form a stable frame structure through tight insertion fit between the sleeves and the rods, and sizes and shapes of the mounting port cans be adjusted according to different needs.

Further, as the preferred implementation method of this scheme rather than limited, the upper connecting rod 15 is provided with upper hinging portions 151 at both ends, both the front upper sleeve 13 and the rear upper sleeve 14 are provided with upper connecting portions 131, 141 that are correspondingly hinged with left and right sides of the upper hinging portions 151. The lower connecting rod 25 is provided with lower hinging portions 251 at both ends, both the front lower sleeve 23 and the rear lower sleeve 24 are provided with lower connecting portions 231, 241 that are correspondingly hinged with left and right sides of the lower hinging portions 251.

In this embodiment, a bidirectional symmetrical hinge structure for the frame of the folding cart is achieved, so that the folding and unfolding motions are smoother and more stable, preventing frame deformations caused by unilateral forces. Additionally, the load-bearing pressures are effectively dispersed through symmetrical hinge point distribution on left and right sides, significantly enhancing the stability and durability of the overall structural. The dual-side externally wrapped hinges is used to prevent potential pinching hazards when users lift the upper connecting rods for folding, further improving the safety and terrain adaptability of the folding carts.

Further, as the preferred implementation method of this scheme rather than limited, the folding cart further comprises a folding lock release mechanism, wherein the folding lock release mechanism includes a front locking assembly 51 used to limit the front sliding upright rod 32 to slide along the length direction of the front lower rod 21, and a rear locking assembly 52 used to limit the rear sliding upright rod 33 to slide along the length direction of the rear lower rod 22.

In this embodiment, the stability and safety of the folding cart are significantly improved by introducing the folding lock release mechanism. In an expanded state, the front locking assembly 51 and the rear locking assembly 52 ensure that the sliding upright rods will not slide accidentally due to external forces, thereby maintaining the stability of the cart structure and effectively preventing the frame deformation or dumping caused by the movements of the supporting rods. Especially when carrying heavy objects or children, the locking assembly fixes the sliding ends of the sliding upright rods in specific positions through mechanical limit, and releases the locking by manual operation or automatic release mechanism only when the cart needs to be folded, allowing the sliding upright rods to move to achieve folding.

Further, as the preferred implementation method of this scheme rather than limited, the front locking assembly 51 includes a first limiting member 511 arranged on the front lower rod 21 and used to limit a first sliding end 32a of the front sliding upright rod 32 to slide along a direction away from the lower connecting rod 25, and a first locking member 512 arranged on the first sliding end 32a of the front sliding upright rod 32 and used to limit the first sliding end 32a of the front sliding upright rod 32 to slide along a direction near the connecting rod 25.

In this embodiment, a two-way restriction of the sliding movement of the front sliding upright rod 32 on the front lower rod 21 is achieved, which significantly enhances the stability and safety of the folding cart in the expanded state. The first limiting member 511 is fixed on the front lower rod 21 to prevent the first sliding end 32a of the front sliding rod 32 from moving away from the lower connecting rod 25, thereby avoiding the frame tipping or deformation due to insufficient support force. Meanwhile, the first locking member 512 is arranged on the first sliding end 32a of the front sliding upright rod 32 to prevent it from sliding near the lower connecting rod 25, which ensures the stability of the support structure when the cart is carrying heavy objects or children. Through the mechanical limit or buckle structure, the position of the front sliding upright rod 32 is fixed in both directions; only when the folding cart needs to be folded, the locking in both directions is simultaneously released by manual operation or specific release mechanism, allowing the front sliding upright rod 32 to move freely to achieve folding.

Further, as the preferred implementation method of this scheme rather than limited, the rear locking assembly 52 includes a third limiting member 521 arranged on the rear lower rod 22 and used to limit a second sliding end 33a of the rear sliding upright rod 33 to slide along the direction away from the lower connecting rod 25.

Further, as the preferred implementation method of this scheme rather than limited, the first locking member 512 is provided with a first limiting hole 5121, and the front lower rod 21 is provided with a second limiting member 513 corresponding to the first limiting hole 5121. The second limiting member 513 extends into the first limiting hole 5121 to limit the first sliding end 32a of the front sliding upright rod 32 to slide along the direction near the lower connecting rod 25; and the second limiting member 513 disengages from the first limiting hole 5121 so as to release the limitation of the first sliding end 32a of the front sliding upright rod 32 sliding along the direction near the lower connecting rod 25.

In this embodiment, precise locking and unlocking control of the first sliding end 32a of the front sliding upright rod 32 is achieved, which significantly enhances the stability and operational convenience of the folding cart. When the first limiting member 511 extends into the first limiting hole 5121, the first sliding end 32a of the front sliding upright rod 32 is firmly locked and cannot move towards the direction of the lower connecting rod 25, thereby ensuring the stability of the support structure of the cart in the expanded state and effectively preventing the frame deformation or dumping caused by the accidental sliding of the supporting rods. Especially when carrying heavy objects or children, by using the principle of mechanical limit, accurate fixation of the position of the front sliding upright rod 32 is achieved through tight cooperation between the first limiting member 511 and the second limiting member 513/first limit hole 5121. When the folding cart needs to be folded, the second limiting member 513 is disengaged from the first limiting hole 5121 through manual operation, and the locking is released, allowing the front sliding upright rod 32 to move freely to achieve folding. The first locking member is made of soft materials such as silicone, enabling the first limiting member to disengage from the first limiting hole through its elastic deformation.

Further, as the preferred implementation method of this scheme rather than limited, the folding cart further comprises a wheel assembly, wherein the wheel assembly includes a front wheel rack 61, a rear wheel rack 62, and wheels 63 arranged on the front wheel rack 61 and the rear wheel rack 62. An end of the front upper rod 11 away from the intermediate upright rod 31 and an end of the front lower rod 21 away from the intermediate upright rod 31 are hinged to the front wheel rack 61, respectively; and an end of the rear upper rod 12 away from the intermediate upright rod 31 and an end of the rear lower rod 22 away from the intermediate upright rod 31 are hinged to the rear wheel rack 62, respectively.

In this embodiment, all components of the folding cart form a stable quadrilateral support structure in an expanded state, which significantly enhances overall rigidity and load-bearing capacity. Meanwhile, hinged connections ensure that the wheel assembly can be folded synchronously with the frames during folding, which significantly reduces the storage volume. Its working principle is to utilize multi-point hinged connections between the wheel racks and the rods to form a dynamic balance system, which can automatically adapt to road irregularities when pushing the cart through synchronized ground contact of all four wheels to maintain stability, while all hinged points rotate cooperatively to achieve compact storage during folding.

Further, as the preferred implementation method of this scheme rather than limited, the front wheel rack 61 includes a front lower mounting portion 611, a front upper mounting portion 612, and a front wheel rack vertical rod 612 connecting the front lower mounting portion 611 and the front upper mounting portion 612. The rear wheel rack 62 includes a rear lower mounting portion 621, a rear upper mounting portion 622, and a rear wheel rack vertical rod 623 connecting the rear lower mounting portion 621 and the rear upper mounting portion 622.

In this embodiment, when wheel racks are subjected to vertical loads, stresses are dispersed through the support of vertical rods, so as to avoid deformations and fractures caused by local overload. Meanwhile, a layered arrangement of the upper and lower mounting portions provides more functional expansion interfaces for the cart. Its working principle is to connect the upper and lower mounting portions through columnar structures of the front and rear wheel rack vertical rods, so as to form a stable spatial force system. When pushing the cart, vertical forces are directly transmitted by the vertical rods, and lateral forces are shared by the upper and lower mounting portions, which greatly improves the torsional and impact resistance of the wheel racks.

The working principle of this embodiment is as follows.

In the folding cart according to the present invention, a supporting rod assembly is arranged between an upper folding frame and a lower folding frame, an intermediate upright rod is used as a core support body, and a front sliding upright rod and a rear sliding upright rod slide along a front lower rod and a rear lower rod to form a dynamic triangular support structure when unfolded, so that sliding ends of the front sliding upright rod and the rear sliding upright rod automatically slide into predetermined positions to form a stable mechanical support system when the cart is expanded. A hinged connection between the sliding upright rod and the intermediate upright rod enhances a three-dimensional structural support strength of the frame, and the load stress is effectively dispersed. Besides, a sliding installation method is used to achieve linkage retraction of the supporting rod assembly during folding, which avoids multi-node operational complexity of traditional fixed triangular support structure, thereby significantly simplifying folding and expanding motions under the premise of high load-bearing capacity. Therefore, dual improvement of structural strength and operational convenience is achieved, which not only eliminates the risk of supporting rod fracture but also optimizes use experience.

The above described is the implementation method provided in combination with the specific contents. It is not determined that the specific embodiments of the present invention are limited to these descriptions. Any methods and structures that are similar to the present invention, or any technical deductions or substitutions made under the premises of the present invention, should be regarded as the protection scope of the present invention.

What is claimed is:

1. A folding cart, comprising a foldable frame, wherein the foldable frame comprises at least:
   an upper folding frame, which includes at least a front upper rod, a rear upper rod, a front upper sleeve connected to the front upper rod, a rear upper sleeve connected to the rear upper rod, and an upper connecting rod hinged with the front upper sleeve and the rear upper sleeve, respectively;
   a lower folding frame, which includes at least a front lower rod, a rear lower rod; and
   a supporting rod assembly, which includes at least an intermediate upright rod arranged between the upper folding frame and the lower folding frame, and a front sliding upright rod and a rear sliding upright rod arranged on both sides of the intermediate upright rod, respectively,
   wherein one end of the front sliding upright rod is hinged with the intermediate upright rod, and the other end is slidably arranged on the front lower rod along a length direction of the front lower rod; one end of the rear sliding upright rod is hinged with the intermediate upright rod, and the other end is slidably arranged on the rear lower rod along a length direction of the rear lower rod.

2. The folding cart according to claim 1, wherein one end of the front sliding upright rod is hinged at a middle position of the intermediate upright rod,
   one end of the rear sliding upright rod is hinged at the middle position of the intermediate upright rod.

3. The folding cart according to claim 2, further comprising at least a folding lock release mechanism, which includes a front locking assembly for limiting the front sliding upright rod to slide along the length direction of the front lower rod, and a rear locking assembly for limiting the rear sliding upright rod to slide along the length direction of the rear lower rod.

4. The folding cart according to the claim 3, wherein the front locking assembly includes:
   a first limiting member arranged on the front lower rod for limiting a first sliding end of the front sliding upright rod to slide along a direction away from the lower connecting rod, and
   a first locking member arranged on the first sliding end for limiting the first sliding end to slide along a direction approaching the lower connecting rod.

5. The folding cart according to claim 4, wherein the first locking member is provided with a first limiting hole, a second limiting member is configured on the front lower rod corresponding to the first limiting hole; the second limiting member extends into the first limiting hole for limiting the first sliding end to slide along the direction approaching the lower connecting rod;
   the second limiting member disengages from the first limiting hole so as to release the limitation of the first sliding end sliding along the direction approaching the lower connecting rod.

6. The folding cart according to claim 5, wherein the rear locking assembly includes a third limiting member arranged on the rear lower rod for limiting a second sliding end of the rear sliding upright rod to slide along a direction away from the lower connecting rod.

7. The folding cart according to claim 1, wherein the lower folding frame further includes at least a front lower sleeve connected to the front lower rod, a rear lower sleeve connected to the rear lower rod, and a lower connecting rod hinged with the front lower sleeve and the rear lower sleeve, respectively.

8. The folding cart according to claim 7, wherein the front upper sleeve, the rear upper sleeve, the front lower sleeve and the rear lower sleeve are provided with mounting openings for inserting one ends of the front upper rod, the rear upper rod, the front lower rod and the rear lower rod, respectively.

9. The folding cart according to claim 8, wherein the upper connecting rod is provided with upper hinging portions at both ends, both the front upper sleeve and the rear upper sleeve are provided with an upper connecting portion that is correspondingly hinged with left and right sides of the upper hinging portions, respectively;
   the lower connecting rod is provided with lower hinging portions at both ends, both the front lower sleeve and the rear lower sleeve are provided with a lower connecting portion that is correspondingly hinged with left and right sides of the lower hinging portions, respectively.

10. The folding cart according to claim 1, wherein the folding cart further comprises a wheel assembly, which includes a front wheel rack, a rear wheel rack, and wheels arranged on the front wheel rack and the rear wheel rack;
   an end of the front upper rod away from the intermediate upright rod and an end of the front lower rod away from the intermediate upright rod are hinged to the front wheel rack, respectively;
   an end of the rear upper rod away from the intermediate upright rod and an end of the rear lower rod away from the intermediate upright rod are hinged to the rear wheel rack, respectively.

11. The folding cart according to claim 10, wherein the front wheel rack includes a front lower mounting portion, a front upper mounting portion, and a front wheel rack vertical rod connecting the front lower mounting portion and the front upper mounting portion;
   the rear wheel rack includes a rear lower mounting portion, a rear upper mounting portion, and a rear wheel rack vertical rod connecting the rear lower mounting portion and the rear upper mounting portion.

* * * * *